United States Patent
Safonov

(10) Patent No.: US 7,702,177 B2
(45) Date of Patent: Apr. 20, 2010

(54) METHOD AND APPARATUS FOR ADJUSTING BRIGHTNESS OF IMAGE

(75) Inventor: Ilia Vladimirovich Safonov, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1031 days.

(21) Appl. No.: 11/409,082

(22) Filed: Apr. 24, 2006

(65) Prior Publication Data

US 2006/0239583 A1    Oct. 26, 2006

(30) Foreign Application Priority Data

Apr. 25, 2005  (RU) ............................... 2005112311
Mar. 29, 2006  (KR) ..................... 10-2006-0028423

(51) Int. Cl.
*G06K 9/40*    (2006.01)

(52) U.S. Cl. .................... 382/274; 382/206; 382/275

(58) Field of Classification Search ................ 382/260, 382/274, 275
See application file for complete search history.

(56) References Cited

U.S. PATENT DOCUMENTS

| | | | |
|---|---|---|---|
| 6,337,472 B1 * | 1/2002 | Garner et al. | 250/201.3 |
| 6,636,646 B1 * | 10/2003 | Gindele | 382/274 |
| 6,738,510 B2 * | 5/2004 | Tsuruoka et al. | 382/167 |
| 6,747,757 B1 * | 6/2004 | Enomoto | 358/1.9 |
| 6,801,334 B1 * | 10/2004 | Enomoto | 358/1.18 |

FOREIGN PATENT DOCUMENTS

| | | |
|---|---|---|
| JP | 09-065252 | 3/1997 |
| JP | 2004-056391 | 2/2004 |
| JP | 2004-289400 | 10/2004 |
| KR | 1999-0016228 | 3/1999 |
| KR | 1999-0051003 | 7/1999 |
| KR | 1020010105680 A | 11/2001 |

* cited by examiner

*Primary Examiner*—Yosef Kassa
(74) *Attorney, Agent, or Firm*—Roylance, Abrams, Berdo & Goodman, LLP

(57) ABSTRACT

A method and apparatus for adjusting brightness of an image are provided, in which number distribution information of pixel brightness is detected, and the brightness of a specific area of the image is adjusted using characteristic values according to a distribution characteristic of the detected number distribution information. Accordingly, a decrease in an image recognition characteristic of a human being is compensated for in a specific area, such as, low-brightness area, of an image.

18 Claims, 9 Drawing Sheets

METHOD AND APPARATUS FOR ADJUSTING BRIGHTNESS OF IMAGE

This application claims the benefit under 35 U.S.C. §119(a) of Russian Patent Application No. 2005112311, filed on Apr. 25, 2005, in the Russian Patent Office, and Korean Patent Application No. 10-2006-0028423, filed on Mar. 29, 2006, in the Korean Intellectual Property Office, the entire disclosure of both of which are hereby incorporated by reference.

CROSS-REFERENCE TO RELATED PATENT APPLICATION

1. Field of the Invention

The present invention relates to image processing. More particularly, the present invention relates to a method and apparatus for adjusting the brightness of a specific area of an image.

2. Description of the Related Art

Recently, image processing devices, such as digital cameras and camcorders, allow users to easily capture high resolution images. In general, these images are uploaded to a personal computer (PC) and edited, and then may be stored in a storage space of the PC or printed by a print device such as a printer or a multi function peripheral (MFP).

However, in such images, highs and lows of brightness can be difficult to discriminate in a specific area. In particular, a low-brightness area (dark area) can be difficult to discriminate, according to the characteristic of human vision. Thus, in the low-brightness area of the image, the light and shade cannot be clearly discriminated. If the brightness of the entire image is increased, the brightness of a high-brightness area of the image increases as well. Thus, the high-brightness area is shown as white and cannot be recognized as an image.

Accordingly, there is a need for an improved method and apparatus for adjusting a brightness of a specific area of an image.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for adjusting the brightness of an image to compensate for the degradation of a human image recognition characteristic on a specific area.

According to an aspect of exemplary embodiments of the present invention, there is provided a method of adjusting the brightness of an image, in which number distribution information of pixel brightness is detected; and adjusting the brightness of a specific area of the image using characteristic values according to a distribution characteristic of the detected number distribution information.

According to another aspect of exemplary embodiments of the present invention, there is provided an apparatus for adjusting the brightness of an image, in which a distribution information detector detecting number distribution information of pixel brightness; and a brightness adjuster adjusting the brightness of a specific area of the image using characteristic values according to a distribution characteristic of the detected number distribution information.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
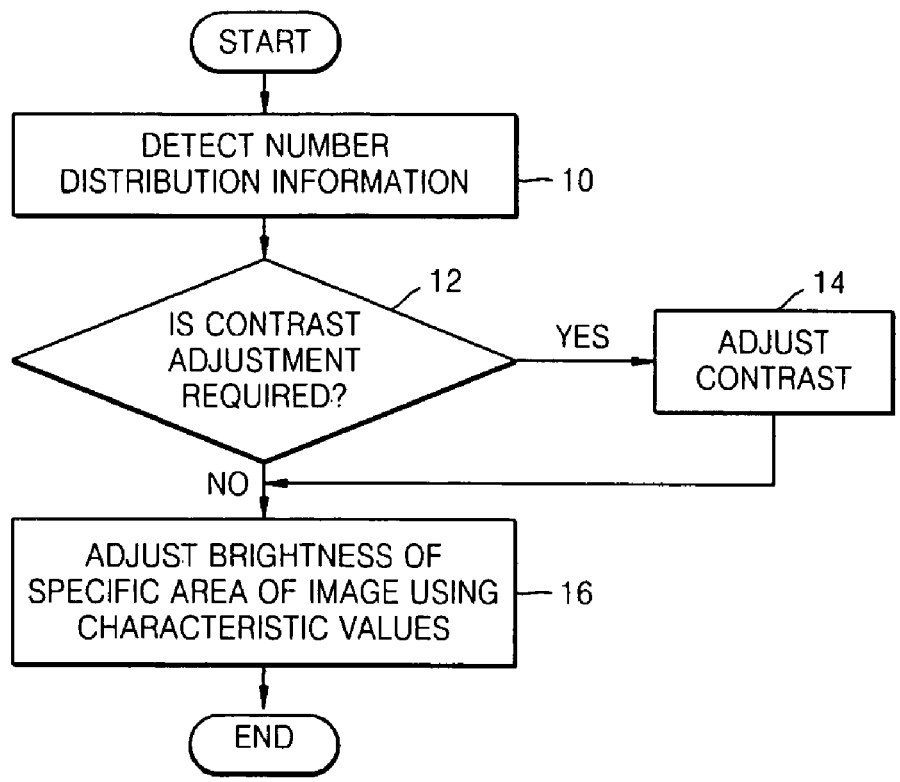
FIG. 1 is a flowchart illustrating a method of adjusting the brightness of an image according to an exemplary embodiment of the present invention.

FIG. 1 is a flowchart illustrating a method of adjusting the brightness of an image according to an exemplary embodiment of the present invention.

Referring to FIG. 1, in operation 10, number distribution information of pixel brightness of the image is detected. The number distribution information is information regarding the number of pixels having the same brightness, which is obtained by classifying pixels of the image according to the brightness of each pixel. Accordingly, presenting the number distribution information by a histogram is appropriate.

In operation 12, a determination is made as to whether contrast adjustment of the image is required. If the contrast adjustment of the image is not required, this process goes to operation 16 which adjust brightness of a specific area of the image using characteristic values. If the contrast adjustment of the image is required, in operation 14, contrast of the image is adjusted.

Figure 2:
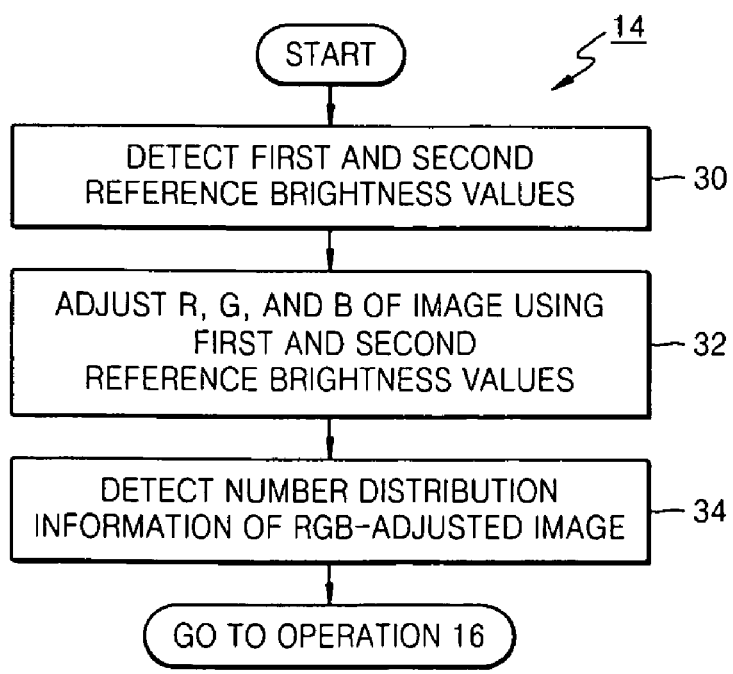
FIG. 2 is a detailed flowchart illustrating operation 14 of FIG. 1.

FIG. 2 is a detailed flowchart illustrating operation 14 of FIG. 1.

Referring to FIG. 2, in operation 30, a first reference brightness value indicating low-brightness and a second reference brightness value indicating high-brightness are detected from the image.

When a brightness value corresponding to the minimum number of pixels among brightness values of which the number of pixels exceeds a first threshold number is less than a first threshold brightness value, the brightness value less than the first threshold brightness value is detected as the first reference brightness value. The first threshold number is a predetermined number used as a comparison reference when the first reference brightness value is obtained in a low-brightness area of the image, and the first threshold brightness value is a predetermined brightness value used as another comparison reference when the first reference brightness value is obtained in the low-brightness area of the image. The first reference brightness value is obtained using Equation 1.

$$\text{low} = \min(i) : H(i) > N_1 \text{ and } i \leq T_1 \quad (1)$$

In equation 1, low denotes the first reference brightness value, $H(i)$ denotes the number of pixels corresponding to a brightness value $i$, $N_1$ denotes the first threshold number, and $T_1$ denotes the first threshold brightness value.

In addition, when a brightness value corresponding to the maximum number of pixels among brightness values of which the number of pixels exceeds a second threshold number is greater than a second threshold brightness value, the brightness value greater than the second threshold brightness value is detected as the second reference brightness value. The second threshold number is a predetermined number used as a comparison reference when the second reference brightness value is obtained in a high-brightness area of the image, and the second threshold brightness value is a predetermined brightness value used as another comparison reference when the second reference brightness value is obtained in the high-brightness area of the image. The second reference brightness value is obtained using Equation 2.

$$\text{high} = \max(i) : H(i) > N_2 \text{ and } i \geq T_2 \quad (2)$$

Here, high denotes the second reference brightness value, $H(i)$ denotes the number of pixels corresponding to a brightness value $i$, $N_2$ denotes the second threshold number, and $T_2$ denotes the second threshold brightness value.

Figure 3A:
FIGS. 3A and 3B illustrate an image and a histogram of number distribution information of the image.
Figure 3B:
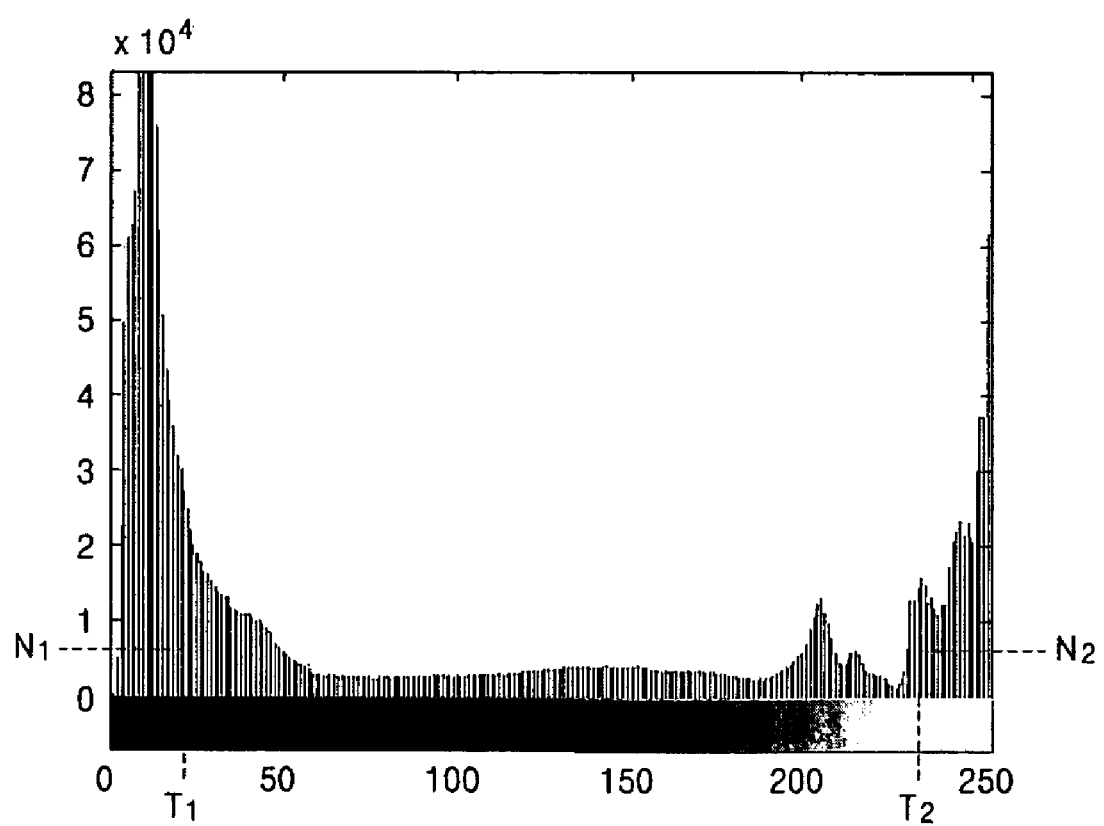

FIGS. 3A and 3B illustrates an image and a histogram of number distribution information of the image. FIG. 3A illustrates the image, and FIG. 3B shows number distribution information of the image of FIG. 3A as a histogram. If an assumption is made that $T_1$ is the first threshold brightness value, and $N_1$ is the first threshold number, a brightness value corresponding to the minimum number of pixels among brightness values less than $T_1$ of which the number of pixels exceeds $N_1$ is detected as the first reference brightness value. In addition, if an assumption is made that $T_2$ is the second threshold brightness value, and $N_2$ is the second threshold number, a brightness value corresponding to the maximum number of pixels among brightness values greater than $T_2$ of which the number of pixels exceeds $N_2$ is detected as the second reference brightness value.

In operation 32, R, G, and B of the image are adjusted using the detected first and second reference brightness values.

To adjust R, G, and B of the image, Equation 3 is used.

$$R'(r,c) = (2^n - 1) * (R(r,c) - \text{low}) / (\text{high} - \text{low})$$

$$G'(r,c) = (2^n - 1) * (G(r,c) - \text{low}) / (\text{high} - \text{low}) \quad (3)$$

$$B'(r,c) = (2^n - 1) * (R(r,c) - \text{low}) / (\text{high} - \text{low})$$

Here, r and c denote coordinates of each pixel of the image, n denotes a constant indicating the number of gradations of brightness, low denotes the first reference brightness value, and high denotes the second reference brightness value.

The contrast of the image is adjusted by adjusting new R', G', and B' using Equation 3. For example, the contrast of the image may be stretched in an exemplary embodiment of the present invention.

In operation 34, number distribution information of the image whose R, G, and B are adjusted is detected. The number distribution information of the image whose R, G, and B are adjusted can be detected as histogram information as described above.

Referring back to FIG. 1, in operation 16, the brightness of a specific area of the image is adjusted using characteristic values according to a distribution characteristic of the detected number distribution information. Examples of the characteristic values according to the distribution characteristic of the detected number distribution information will be described later.

Figure 4:
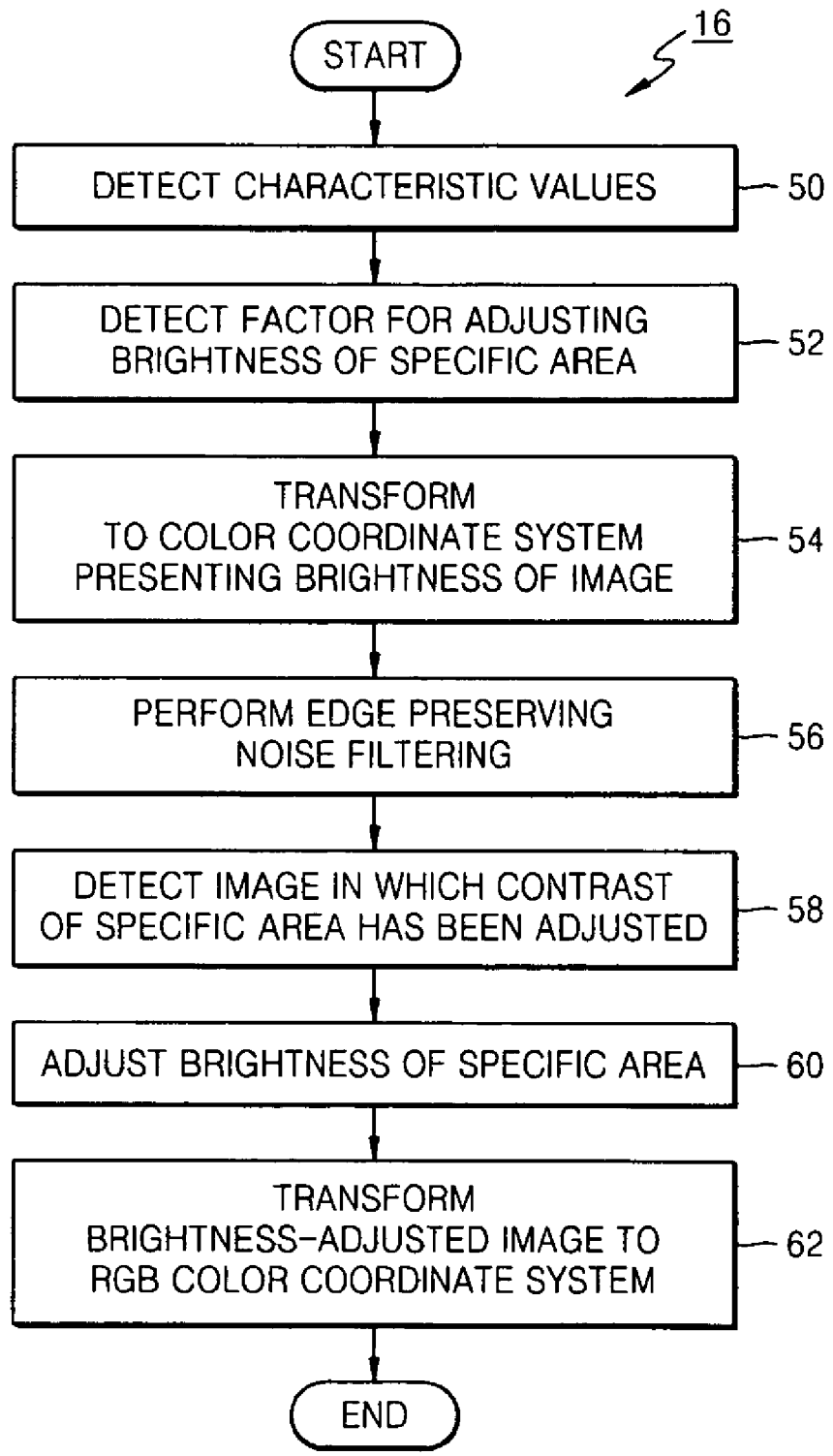
FIG. 4 is a detailed flowchart illustrating operation 16 of FIG. 1.

FIG. 4 is a detailed flowchart illustrating operation 16 of FIG. 1.

Referring to FIG. 4, in operation 50, characteristic values are detected.

The number distribution information presented as a histogram is divided into a plurality of areas based on the brightness, and characteristic values of each of the divided areas are detected. In particular, the plurality of areas may be divided into a first divided area, second divided area, and third divided area. However, the area division is an illustration, and the histogram can be divided into various areas.

Figure 5:
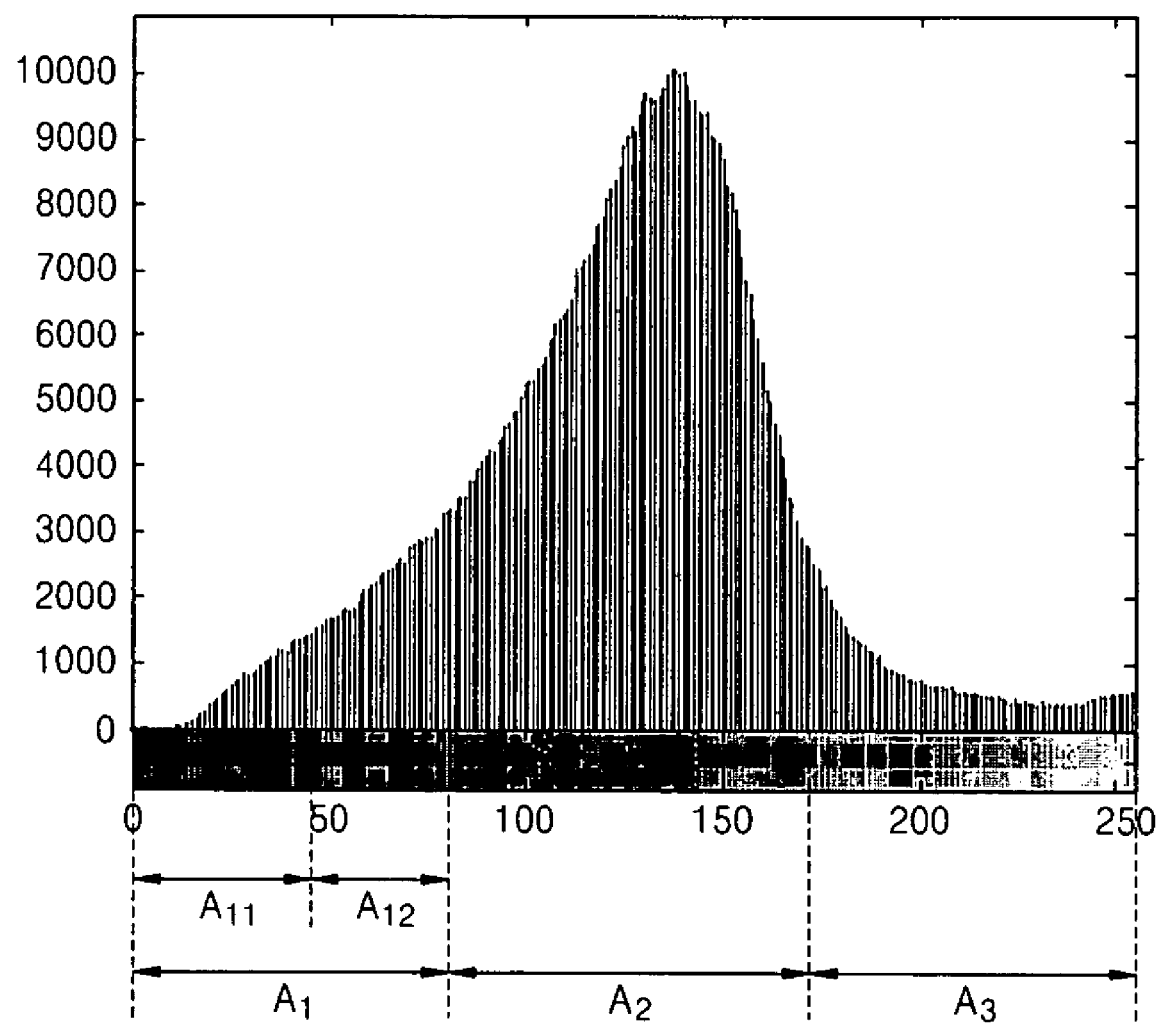
FIG. 5 is a diagram of number distribution information presented as a histogram which is divided into first through third divided areas based on the brightness.

FIG. 5 is a diagram of the number distribution information presented as a histogram which is divided into the first through third divided areas based on the brightness. As illustrated in FIG. 5, the histogram is divided into the first divided area $A_1$, the second divided area $A_2$, and the third divided area $A_3$, based on the brightness. The first divided area $A_1$ is a low-brightness area, the second divided area $A_2$ is an intermediate-brightness area, and the third divided area $A_3$ is a high-brightness area. The first divided area $A_1$ is divided into two areas, a first sub-area $A_{11}$ and a second sub-area $A_{12}$.

To detect the characteristic values of the divided areas, Equations 4 through 8 are used.

$$gm = \max_{i \in [0, 2^n - 1]} (H(i)) \quad (4)$$

In equation 4, $H(i)$ denotes the number of pixels corresponding to a brightness value $i$, gm denotes the maximum number of pixels among the number of pixels corresponding to brightness values of the image, and denotes a constant indicating the number of gradations of brightness. For example, when $n=8$, gm is the maximum number of pixels among the number of pixels corresponding to brightness values of the image having 0 to 255 brightness gradations.

$$S_1 = \sum_{first} H(i)/(M*N),$$

$$S_2 = \sum_{second} H(i)/(M*N), \quad (5)$$

$$S_3 = \sum_{third} H(i)/(M*N)$$

In equation 5, $S_1$ denotes a pixel number ratio of brightness corresponding to the first divided area $A_1$ in the entire image, $S_2$ denotes a pixel number ratio of brightness corresponding to the second divided area $A_2$ in the entire image, $S_3$ denotes a pixel number ratio of brightness corresponding to the third divided area $A_3$ in the entire image, and M*N denotes the size (resolution) of the image.

$$S_{11} = \sum_{i=0}^{[(2^n-1)/6]-1} H(i)/(M*N), S_{12} = \sum_{i=(2^n-1)/6}^{(2^n-1)/3} H(i)/(M*N) \quad (6)$$

When the first divided area $A_1$ is divided into the first sub-area $A_{11}$ and the second sub-area $A_{12}$, $S_{11}$ denotes a pixel number ratio of brightness corresponding to the first sub-area $A_{11}$ in the entire image and $S_{12}$ denotes a pixel number ratio of brightness corresponding to the second sub-area $A_{12}$ in the entire image, in equation 6.

$$R_1 = \max_{first}(H(i))\Big/gm, \quad (7)$$
$$R_2 = \max_{second}(H(i))\Big/gm,$$
$$R_3 = \max_{third}(H(i))\Big/gm$$

In equation 7, $R_1$ denotes a ratio of the maximum number of pixels among the number of pixels corresponding to brightness values in the first divided area $A_1$ to gm, which is the maximum number of pixels among the number of pixels corresponding to brightness values of the image, $R_2$ denotes a ratio of the maximum number of pixels among the number of pixels corresponding to brightness values in the second divided area $A_2$ to gm, and $R_3$ denotes a ratio of the maximum number of pixels among the number of pixels corresponding to brightness values in the third divided area $A_3$ to gm.

$$P_1 = h/(2^n-1), P_2 = l/(2^n-1) \quad (8)$$

In equation 8, h denotes a brightness value having the maximum number of pixels in the first divided area $A_1$, $P_1$ denotes a ratio of h to $2^n$ gradations, l denotes a brightness value having the maximum number of pixels in the third divided area $A_3$, and $P_2$ denotes a ratio of l to $2^n$ gradations.

In operation 52, a factor a for adjusting the brightness of the specific area is detected using the detected characteristic values.

Figure 6:
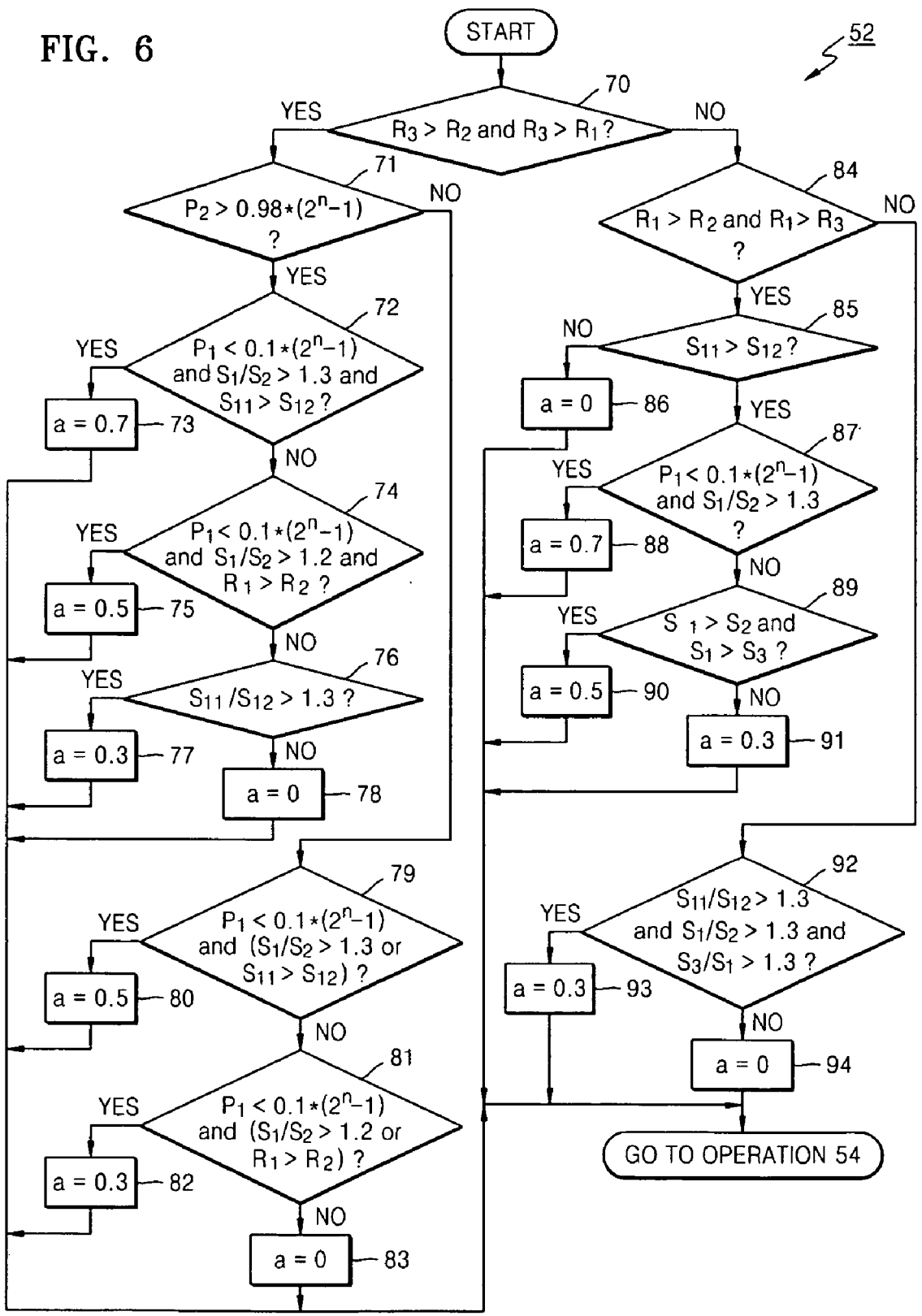
FIG. 6 is a detailed flowchart illustrating operation 52 of FIG. 4.

FIG. 6 is a detailed flowchart illustrating operation 52 of FIG. 4.

Referring to FIG. 6, in operation 70, a determination is made as to whether the characteristic value $R_3$ is greater than both the characteristic value $R_2$ and the characteristic value $R_1$.

If it is determined that the characteristic value $R_3$ is greater than both the characteristic value $R_2$ and the characteristic value $R_1$, in operation 71, a determination is made as to whether the characteristic value $P_2$ is greater than 0.98*($2^n$-1).

If it is determined that the characteristic value $P_2$ is greater than 0.98*($2^n$-1), in operation 72, a determination is made as to whether the characteristic value $P_1$ is less than 0.1*($2^n$-1) $S_1/S_2$ is greater than 1.3, and $S_{11}$ is greater than $S_{12}$.

If it is determined that the characteristic value $P_1$ is less than 0.1*($2^n$-1), $S_1/S_2$ is greater than 1.3, and $S_{11}$ is greater than $S_{12}$, in operation 73, the factor a is detected as 0.7.

If it is not determined that the characteristic value $P_1$ is less than 0.1*($2^n$-1), is greater than 1.3, and $S_{11}$ is greater than $S_{12}$, in operation 74, a determination is made as to whether the characteristic value $P_1$ is less than 0.1*($2^n$-1), $S_1/S_2$ is greater than 1.2, and $R_1$ is greater than $R_2$.

If it is determined that the characteristic value $P_1$ is less than 0.1*($2^n$-1), $S_1/S_2$ is greater than 1.2, and $R_1$ is greater than $R_2$, in operation 75, the factor a is detected as 0.5.

If it is not determined that the characteristic value $P_1$ is less than 0.1*($2^n$-1), $S_1/S_2$ is greater than 1.2, and $R_1$ is greater than $R_2$, in operation 76, a determination is made as to whether $S_{11}/S_{12}$ is greater than 1.3.

If it is determined that $S_{11}/S_{12}$ is greater than 1.3, in operation 77, the factor a is detected as 0.3.

If it is determined that $S_{11}/S_{12}$ is equal to or less than 1.3, in operation 78, the factor a is detected as 0.

If it is determined in operation 71 that the characteristic value $P_2$ is equal to or less than 0.98*($2^n$-1), in operation 79, a determination is made as to whether the characteristic value $P_1$ is less than 0.1*($2^n$-1) and $S_1/S_2$ is greater than 1.3 or $S_{11}$ is greater than $S_{12}$.

If it is determined that the characteristic value $P_1$ is less than 0.1*($2^n$-1) and $S_1/S_2$ is greater than 1.3 or $S_{11}$ is greater than $S_{12}$, in operation 80, the factor a is detected as 0.5.

If it is not determined that the characteristic value $P_1$ is less than 0.1*($2^n$-1) and $S_1/S_2$ is greater than 1.3 or $S_{11}$ is greater than $S_{12}$, in operation 81, a determination is made as to whether the characteristic value $P_1$ is less than 0.1*($2^n$-1) and $S_1/S_2$ is greater than 1.2 or $R_1$ is greater than $R_2$.

If it is determined that the characteristic value $P_1$ is less than 0.1*($2^n$-1) and $S_1/S_2$ is greater than 1.2 or $R_1$ is greater than $R_2$, in operation 82, the factor a is detected as 0.3.

If it is not determined that the characteristic value $P_1$ is less than 0.1*($2^n$-1) and $S_1/S_2$ is greater than 1.2 or $R_1$ is greater than $R_2$, in operation 83, the factor a is detected as 0.

If it is not determined in operation 70 that the characteristic value $R_3$ is greater than both the characteristic value $R_2$ and the characteristic value $R_1$, in operation 84, a determination is made as to whether the characteristic value $R_1$ is greater than both the characteristic value $R_2$ and the characteristic value $R_3$.

If it is determined that the characteristic value $R_1$ is greater than both the characteristic value $R_2$ and the characteristic value $R_3$, in operation 85, it is determined whether the characteristic value $S_{11}$ is greater than the characteristic value $S_{12}$.

If it is not determined that the characteristic value $S_{11}$ is greater than the characteristic value $S_{12}$, in operation 86, the factor a is detected as 0.

If it is determined that the characteristic value $S_{11}$ is greater than the characteristic value $S_{12}$, in operation 87, a determination is made as to whether the characteristic value $P_1$ is less than and is greater than 1.3.

If it is determined that the characteristic value $P_1$ is less than 0.1*($2^n$-1) and $S_1/S_2$ is greater than 1.3, in operation 88, the factor a is detected as 0.7.

If it is not determined that the characteristic value $P_1$ is less than 0.1*($2^n$-1) and $S_1/S_2$ is greater than 1.3, in operation 89, a determination is made as to whether the characteristic value $S_1$ is greater than both the characteristic value $S_2$ and the characteristic value $S_3$.

If it is determined that the characteristic value $S_1$ is greater than both the characteristic value $S_2$ and the characteristic value $S_3$, in operation 90, the factor a is detected as 0.5.

If it is not determined that the characteristic value $S_1$ is greater than both the characteristic value $S_2$ and the characteristic value $S_3$, in operation 91, the factor a is detected as 0.3.

If it is not determined in operation 84 that the characteristic value $R_1$ is greater than both the characteristic value $R_2$ and the characteristic value $R_3$, in operation 92, a determination is made as to whether each of $S_{11}/S_{12}$, $S_1/S_2$, and $S_3/S_1$ is greater than 1.3.

If it is determined that each of $S_{11}/S_{12}$, $S_1/S_2$, and $S_3/S_1$ is greater than 1.3, in operation 93, the factor a is detected as 0.3.

If it is not determined that each of $S_{11}/S_{12}$, $S_1/S_2$, and $S_3/S_1$ is greater than 1.3, in operation 94, the factor a is detected as 0.

The above-described procedures of detecting the factor a and the determined factor values are only an illustration. Exemplary embodiments of the present invention can be implemented using the detected characteristic values, and the determined factor values are not limited to the above-described values and can be variously determined.

Referring back to FIG. 4, in operation 54, an RGB color coordinate system of the image is transformed to a color coordinate system presenting brightness. That is, the RGB color coordinate system of the image is transformed to at least one of a Hue, Saturation, Value (HSV) color coordinate system, YCbCr color coordinate system, Lab color coordinate system, and XYZ color coordinate system. For, in an exemplary embodiment of the present invention, the RGB color coordinate system of the image may be transformed to the HSV color coordinate system. From the image transformed to the HSV color coordinate system, Value corresponding to a brightness value can be detected.

In operation 56, edge preserving noise filtering of the image transformed to the color coordinate system presenting brightness is performed.

The edge preserving noise filtering is performed by filtering rows of the image and then filtering columns of the image based on the row filtering result, or filtering columns of the image and then filtering rows of the image based on the column filtering result.

The edge preserving noise filtering is performed using Equations 9 and 10.

$$V_f^*(r, c) = \frac{\sum_{j=-S/2}^{S/2} V(r, c+j) * u(j) * w(V(r, c+j), V(r, c))}{\sum_{j=-S/2}^{S/2} u(j) * w(V(r, c+j), V(r, c))} \quad (9)$$

In equation 9, V(r,c) denotes brightness of the original image, $V_f^*(r,c)$ denotes a result obtained by filtering at least one of the rows and columns of the image V(r,c), S denotes a window size for the filtering, u(z) denotes the equation $$u(z) = \exp\left(-\frac{z^2}{2\sigma_D^2}\right),$$

w(x,y) denotes the equation $$w(x, y) = \exp\left(-\frac{(x-y)^2}{2\sigma_R^2}\right),$$

and $\sigma_D$ and $\sigma_R$ denote predetermined constants. For example, $\sigma_D=5$ and $\sigma_R=0.1*(2^n-1)$ can be set.

$$V_f(r, c) = \frac{\sum_{i=-S/2}^{S/2} V_f^*(r+i, c) * u(i) * w(V_f^*(r+i, c), V_f^*(r, c))}{\sum_{i=-S/2}^{S/2} u(i) * w(V_f^*(r+i, c), V_f^*(r, c))} \quad (10)$$

In equation 10, V(r,c) denotes a result obtained by filtering the unfiltered rows or columns using the filtering result $V_f^*(r,c)$. For example, if $V_f^*(r,c)$ of the rows of the image is detected using Equation 9, V(r,c) of the columns of the image is detected using Equation 10. Inversely, if $V_f^*(r,c)$ of the columns of the image is detected using Equation 9, V(r,c) of the rows of the image is detected using Equation 10.

Figure 7A:
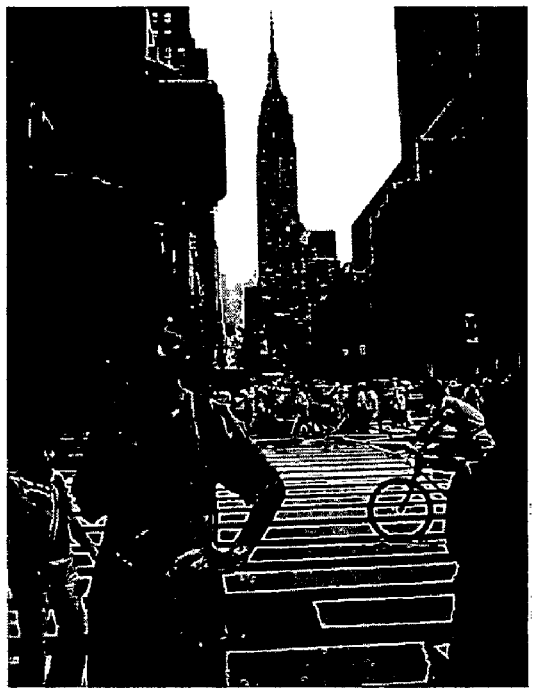
FIGS. 7A-7D illustrate images obtained by performing operations of FIG. 4.
Figure 7B:
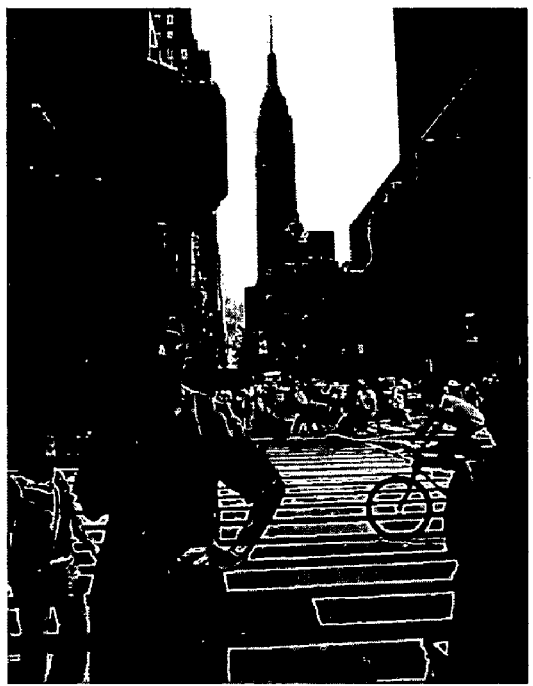

FIGS. 7A-7D illustrate images obtained by performing operations of FIG. 4. FIG. 7A shows an original image, and FIG. 7B shows a result obtained by performing the edge preserving noise filtering of the original image. As illustrated in FIG. 7B, the image is blurred as the edge preserving noise filtering result.

Since the edge preserving noise filtering is performed by filtering rows of the image and then filtering columns of the image based on the row filtering result, or filtering columns of the image and then filtering rows of the image based on the column filtering result, the calculation amount can be reduced compared to a method of simultaneously filtering the rows and columns of the image.

In operation 58, an image in which contrast of the specific area has been adjusted is detected from the image in which the edge preserving noise filtering has been performed.

To detect the image in which contrast of the specific area has been adjusted, Equation 11 is used.

$$D = f(V_f, V) = (2^n - 1) * k * V / (V_f + b) \quad (11)$$

In equation 11, D denotes the contrast-adjusted image, and k and b denote predetermined constants. For example, k=1.2 and b=3*$\sigma_R$ can be set. By using Equation 11, the contrast of the specific area, for example, the low-brightness area, of the original image is adjusted.

Figure 7C:
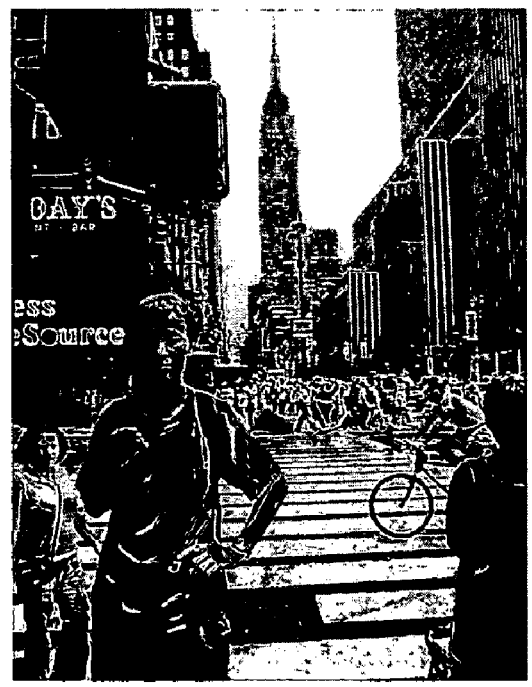

FIG. 7C shows the image obtained by adjusting the contrast of the specific area using Equation 11 from the image in which the edge preserving noise filtering has been performed. As illustrated in FIG. 7C, by adjusting contrast of the specific area, that is, a dark area, the contrast of the dark area of the filtered image is improved.

In operation 60, brightness of the specific area is adjusted using the contrast-adjusted image.

To adjust the brightness of the specific area, Equation 12 is used.

$$V' = f(V + a * (2^n - 1 - V_f) * f_b(D - V)) \quad (12)$$

In equation 12, V' denotes the image, in which brightness of the specific area has been adjusted, a denotes the factor detected in operation 52 using the characteristic values, $f_w(x)$ denotes $$f_w(x) = \begin{cases} x : x \leq (2^n - 1) \\ 2^n - 1 : x > (2^n - 1) \end{cases},$$

and $f_b(x)$ denotes $$f_b(x) = \begin{cases} x/(2^n - 1) : x \geq 0 \\ 0 : x < 0 \end{cases}.$$

Figure 7D:

FIG. 7D shows the image in which the brightness of the specific area has been adjusted, which is obtained using Equation 12 from the contrast-adjusted image. As illustrated in FIG. 7D, by adjusting the brightness of the specific area, that is, the dark area, an image in which the brightness of the dark area has been improved compared to the original image is obtained.

Figure 8:
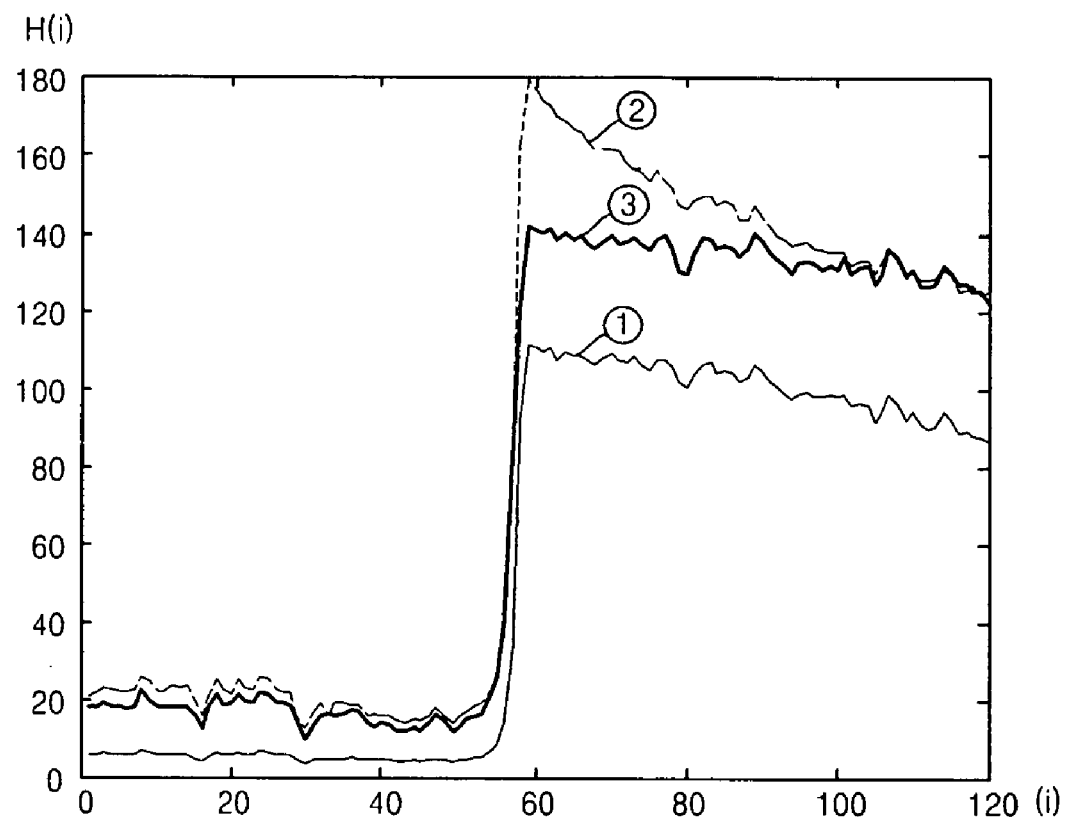
FIG. 8 is a diagram for comparing the brightness of a specific area of an image according to an exemplary embodiment of the present invention.

FIG. 8 is a diagram for comparing the brightness of a specific area of an image according to the present invention and the prior art. Reference ① is a graph showing the variation of the number of pixels according to brightness of the original image, reference ② is a graph showing the variation of the number of pixels according to the brightness of the image, which is obtained conventionally, in which the brightness of the image is entirely adjusted high, and reference ③ is a graph showing the variation of the number of pixels according to the brightness of the image, which is obtained according to an exemplary embodiment of the present invention. As illustrated in FIG. 8, while image quality of a high-brightness area of the original image may be degraded conventionally by adjusting the brightness of the image entirely high, by adjusting the brightness of only the dark area according to an exemplary embodiment of the present invention as described above, the degradation of image quality of a relatively-high-brightness area can be prevented, and simultaneously image quality of the dark area can be improved simultaneously.

In operation 62, the color coordinate system of the brightness-adjusted image is transformed to the RGB color coordinate system. That is, the image, which has been transformed to the color coordinate system presenting brightness and whose brightness has been adjusted, is transformed to the RGB color coordinate system so that a human being can recognize the image in reality.

The method for adjusting the brightness of an image according to exemplary embodiments of the present invention can be written as codes/instructions/programs and can be implemented in general-use digital computers that execute the codes/instructions/programs using a computer readable recording medium. Examples of the computer readable recording medium include magnetic storage media (for example, ROM, floppy disks, hard disks, and the like), optical recording media (for example, CD-ROMs, or DVDs), and storage media such as carrier waves (for example, transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

An apparatus for adjusting the brightness of an image according to an embodiment of the present invention will now be described with reference to the accompanying drawings.

Figure 9:
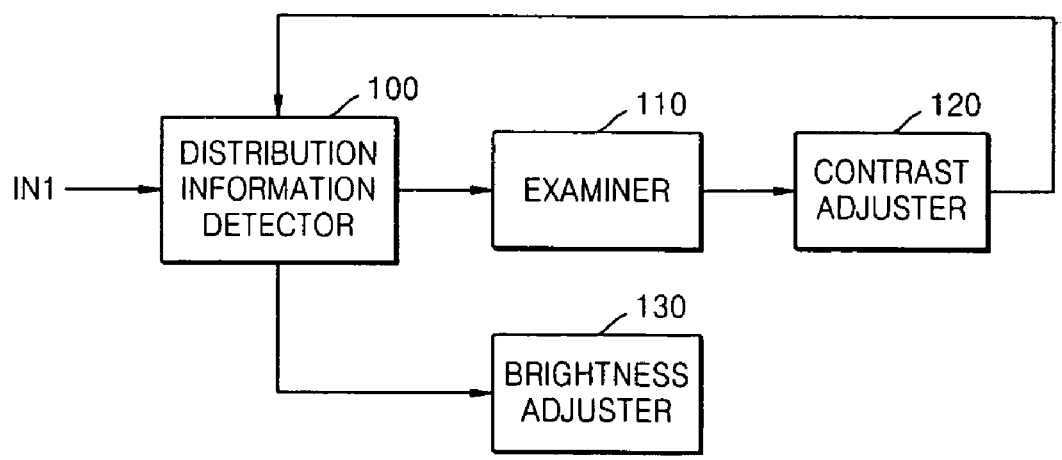
FIG. 9 is a block diagram of an apparatus for adjusting the brightness of an image according to an exemplary embodiment of the present invention.

FIG. 9 is a block diagram of an apparatus for adjusting the brightness of an image according to an exemplary embodiment of the present invention. Referring to FIG. 9, the apparatus includes a distribution information detector 100, examiner 110, contrast adjuster 120, and brightness adjuster 130.

The distribution information detector 100 detects number distribution information of pixel brightness of an image input through an input terminal IN1 and outputs the detection result to the examiner 110 and the brightness adjuster 130. The number distribution information is information regarding the number of pixels having the same brightness, which is obtained by classifying pixels of the image according to the brightness of each pixel. For example, presenting the number distribution information by a histogram is appropriate. In addition, when a contrast-adjusted image is received from the contrast adjuster 120, the distribution information detector 100 detects number distribution information of the contrast-adjusted image.

The examiner 110 determines whether contrast adjustment of the image is required and outputs the determination result to the contrast adjuster 120.

When the determination result that the contrast adjustment of the image is required is received from the examiner 110, the contrast adjuster 120 adjusts contrast of the image and outputs the adjustment result to the distribution information detector 100.

Figure 10:
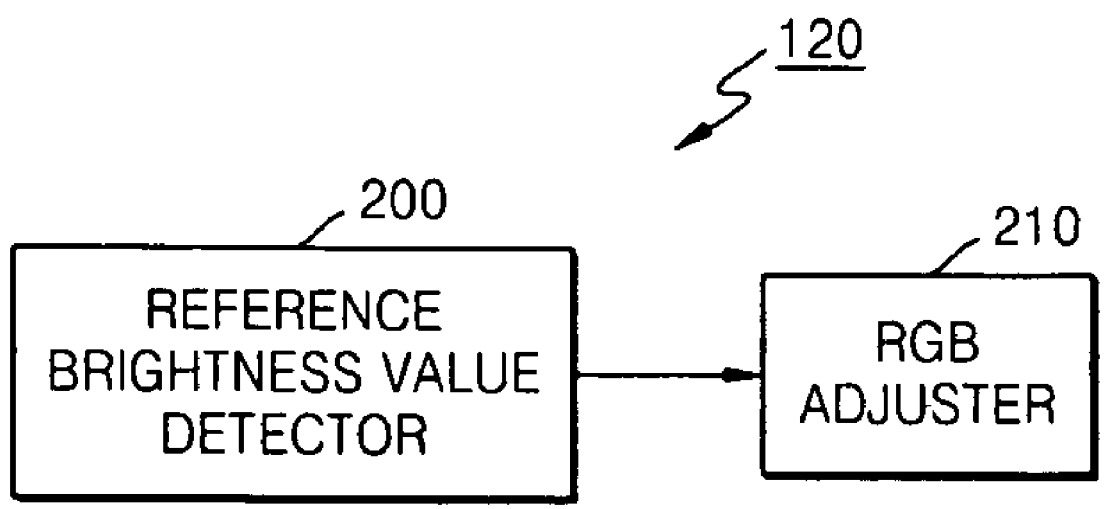
FIG. 10 is a block diagram of a contrast adjuster of FIG. 9.

FIG. 10 is a block diagram of the contrast adjuster 120 of FIG. 9. Referring to FIG. 10, the contrast adjuster 120 includes a reference brightness value detector 200 and an RGB adjuster 210.

The reference brightness value detector 200 detects a first reference brightness value indicating low-brightness and a second reference brightness value indicating high-brightness from the image and outputs the detection result to the RGB adjuster 210.

When a brightness value corresponding to the minimum number of pixels among brightness values of which the number of pixels exceeds a first threshold number is less than a first threshold brightness value, the reference brightness value detector 200 detects the brightness value less than the first threshold brightness value as the first reference brightness value. In addition, when a brightness value corresponding to the maximum number of pixels among brightness values of which the number of pixels exceeds a second threshold number is greater than a second threshold brightness value, the reference brightness value detector 200 detects the brightness value greater than the second threshold brightness value as the second reference brightness value. To detect the first and second reference brightness values, the reference brightness value detector 200 uses Equations 1 and 2 described above.

The RGB adjuster 210 adjusts R, G, and B of the image using the detected first and second reference brightness values. That is, the RGB adjuster 210 adjusts R, G, and B of the image using Equation 3 described above.

Referring back to FIG. 9, the brightness adjuster 130 adjusts brightness of a specific area of the image using characteristic values according to a distribution characteristic of the detected number distribution information.

Figure 11:
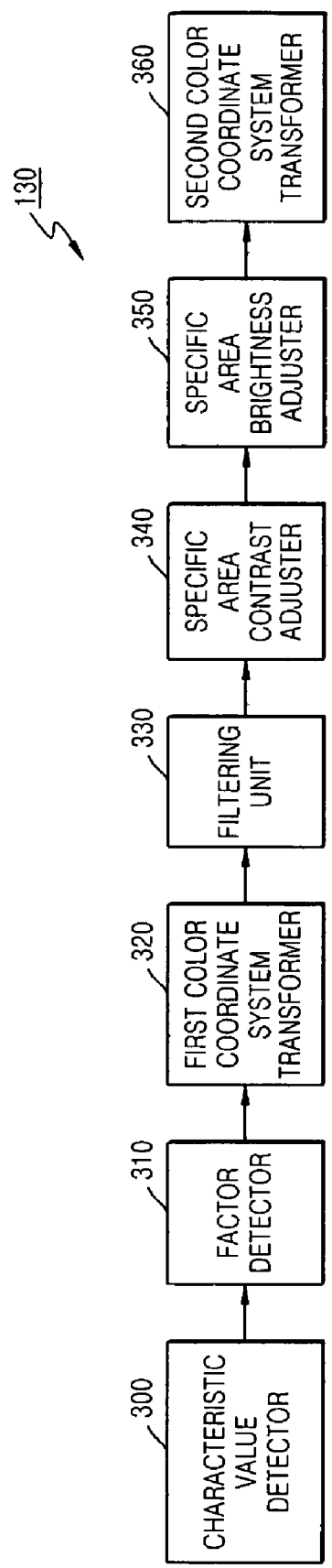
FIG. 11 is a block diagram of a brightness adjuster of FIG. 9.

FIG. 11 is a block diagram of the brightness adjuster 130 of FIG. 9. Referring to FIG. 1, the brightness adjuster 130 includes a characteristic value detector 300, factor detector 310, first color coordinate system transformer 320, filtering unit 330, specific area contrast adjuster 340, specific area brightness adjuster 350, and second color coordinate system transformer 360.

The characteristic value detector 300 detects characteristic values according to a distribution characteristic of the detected number distribution information and outputs the detection characteristic values to the factor detector 310.

The characteristic value detector 300 divides the number distribution information presented as a histogram into a plurality of areas based on the brightness and detects characteristic values of each of the divided areas. For example, the characteristic value detector 300 divides the plurality of areas into a first divided area, second divided area, and third divided area. The characteristic value detector 300 detects the characteristic values using Equations 4 through 8.

The factor detector 310 detects a factor for adjusting brightness of a specific area using the detected characteristic values and outputs the detected factor to the first color coordinate system transformer 320. The factor detector 310 detects a factor according to the detected characteristic values by comparing the detected characteristic values as illustrated in FIG. 6.

The first color coordinate system transformer 320 transforms an RGB color coordinate system of the image to a color coordinate system presenting brightness and outputs the transformation result to the filtering unit 330. The first color coordinate system transformer 320 transforms the RGB color coordinate system of the image to one of the HSV color coordinate system, the YCbCr color coordinate system, the Lab color coordinate system, and the XYZ color coordinate system. For example, the first color coordinate system transformer 320 may transform the RGB color coordinate system of the image to the HSV color coordinate system.

The filtering unit 330 performs the edge preserving noise filtering of the image and outputs the filtering result to the specific area contrast adjuster 340.

The filtering unit 330 filters rows of the image and then filters columns of the image, based on the row filtering result or filters columns of the image and then filters rows of the image, based on the column filtering result. The filtering unit 330 performs the edge preserving noise filtering of the image using Equations 9 and 10 described above. As illustrated in FIG. 7B, the image is blurred by performing the edge preserving noise filtering.

The specific area contrast adjuster 340 detects an image in which contrast of the specific area has been adjusted from the image in which the edge preserving noise filtering has been performed and outputs the detection result to the specific area brightness adjuster 350. The specific area contrast adjuster 340 adjusts the contrast of the specific area using Equation 11 described above. As illustrated in FIG. 7C, by adjusting contrast of the specific area, that is, a dark area, the contrast of the dark area of the filtered image is improved.

The specific area brightness adjuster 350 adjusts brightness of the specific area using the contrast-adjusted image and outputs the adjustment result to the second color coordinate system transformer 360. The specific area brightness adjuster 350 adjusts brightness of the specific area using Equation 12 described above. As illustrated in FIG. 7D, by adjusting the brightness of the specific area, that is, the dark area, an image in which the brightness of the dark area has been improved compared to the original image is obtained.

The second color coordinate system transformer 360 transforms the color coordinate system of the brightness-adjusted image to the RGB color coordinate system. That is, the second color coordinate system transformer 360 transforms the image, which has been transformed to the color coordinate system presenting brightness and whose brightness has been adjusted, to the RGB color coordinate system so that a human being can recognize the image in reality.

As described above, in a method and apparatus for adjusting brightness of an image according to exemplary embodiments of the present invention, by adjusting brightness of a specific area (for example, a dark area), the degradation of image quality of a relatively-high-brightness area can be prevented, and image quality of the dark area can be improved simultaneously.

While the present invention has been shown and described with reference to exemplary embodiments thereof, it will be understood by those skilled in the art that various changes in form and details may be made therein without departing from the spirit and scope of the present invention as defined by the appended claims.

What is claimed is:

1. A method of adjusting brightness of an image, the method comprising:

detecting number distribution information of pixel brightness;

adjusting the brightness of a specific area of the image using characteristic values according to a distribution characteristic of the detected number distribution information;

determining whether contrast adjustment of the image is required; and adjusting contrast of the image in response to determining contrast adjustment of the image is required, wherein at least one of the steps of adjusting the brightness of a specific area of the image, determining whether contrast adjustment of an image is require, and adjusting contrast of the image is performed by a microprocessor.

2. The method of claim 1, wherein the adjusting of the contrast of the image comprises:

detecting a first reference brightness value indicating low-brightness for the image and a second reference brightness value indicating high-brightness for the image;

adjusting R, G, and B of the image using the detected first and second reference brightness values; and detecting number distribution information of the RGB-adjusted image.

3. The method of claim 2, wherein the adjusting of R, G, and B of the image, is adjusted using equation $$R'(r,c)=(2^n-1)*(R(r,c)-\text{low})/(\text{high}-\text{low})$$

$$G'(r,c)=(2^n-1)*(G(r,c)-\text{low})/(\text{high}-\text{low})$$

$$B'(r,c)=(2^n-1)*(B(r,c)-\text{low})/(\text{high}-\text{low})$$

where r and c denote coordinates of each pixel of the image, n denotes a constant indicating the number of gradations of brightness, low denotes the first reference brightness value, and high denotes the second reference brightness value.

4. The method of claim 1, wherein the adjusting of the brightness of the specific area of the image comprises:

detecting the characteristic values;

detecting a factor for adjusting the brightness of the specific area using the detected characteristic values;

transforming an RGB color coordinate system of the image to a color coordinate system presenting brightness;

performing edge preserving noise filtering of the transformed image;

detecting an image in which contrast of the specific area has been adjusted from the image in which the edge preserving noise filtering has been performed;

adjusting brightness of the specific area using the contrast-adjusted image; and transforming the color coordinate system of the brightness-adjusted image to the RGB color coordinate system.

5. The method of claim 4, wherein in the detecting of the characteristic values, the number distribution information presented as a histogram is divided into a plurality of areas based on the brightness, and characteristic values of the divided areas are detected.

6. The method of claim 5, wherein the plurality of areas is divided into a first divided area, a second divided area, and a third divided area.

7. The method of claim 6, wherein the detecting of the characteristic values is detected using the equations below:

$$gm = \max_{i \in [0, 2^n-1]}(H(i))$$

where H(i) denotes the number of pixels corresponding to a brightness value i, gm denotes the maximum number of pixels among the number of pixels corresponding to brightness values of the image, and n denotes a constant indicating the number of gradations of brightness;

$$S_1 = \sum_{first} H(i)/(M*N),$$

$$S_2 = \sum_{second} H(i)/(M*N),$$

$$S_3 = \sum_{third} H(i)/(M*N)$$

where $S_1$ denotes a pixel number ratio of brightness corresponding to the first divided area in the image, $S_2$ denotes a pixel number ratio of brightness corresponding to the second divided area in the image, $S_3$ denotes a pixel number ratio of brightness corresponding to the third divided area in the image, and M*N denotes the size (resolution) of the image;

$$S_{11} = \sum_{i=0}^{[(2^n-1)/6]-1} H(i)/(M*N), \quad S_{12} = \sum_{i=(2^n-1)/6}^{(2^n-1)/3} H(i)/(M*N)$$

where $S_{11}$ denotes a pixel number ratio of brightness corresponding to the first sub-area in the image when the first divided area is divided into a first sub-area and a second sub-area, and $S_{12}$ denotes a pixel number ratio of brightness corresponding to the second sub-area in the image;

$$R_1 = \max_{first}(H(i))\bigg/gm, \; R_2 = \max_{second}(H(i))\bigg/gm, \; R_3 = \max_{third}(H(i))\bigg/gm$$

where $R_1$ a ratio of the maximum number of pixels among the number of pixels corresponding to brightness values in the first divided area to the maximum number of pixels among the number of pixels corresponding to brightness values of the image, $R_2$ denotes a ratio of the maximum number of pixels among the number of pixels corresponding to brightness values in the second divided area to the maximum number of pixels among the number of pixels corresponding to brightness values of the image, and $R_3$ denotes a ratio of the maximum number of pixels among the number of pixels corresponding to brightness values in the third divided area to the maximum number of pixels among the number of pixels corresponding to brightness values of the image; and $$P_1 = h/(2^n-1), P_2 = l/(2^n-1)$$

where h denotes a brightness value having the maximum number of pixels in the first divided area, $P_1$ denotes a ratio of h to $2^n$ gradations, l denotes a brightness value having the maximum number of pixels in the third divided area, and $P_2$ denotes a ratio of l to $2^n$ gradations.

8. The method of claim 4, wherein in the transforming of the RGB color coordinate system of the image to the color coordinate system presenting brightness, the RGB color coordinate system of the image is transformed to one of an Hue, Saturation, Value (HSV) color coordinate system, a YCbCr color coordinate system, a Lab color coordinate system, and an XYZ color coordinate system.

9. The method of claim 4, wherein in the performing of the edge preserving noise filtering, rows of the image are filtered and then columns of the image are filtered based on the row filtering result, or columns of the image filtered and then rows of the image filtered based on the column filtering result.

10. The method of claim 9, wherein the performing of the edge preserving noise filtering is performed using the equations below:

$$V_f^*(r, c) = \frac{\sum_{j=-S/2}^{S/2} V(r, c+j)*u(j)*w(V(r, c+j), V(r, c))}{\sum_{j=-S/2}^{S/2} u(j)*w(V(r, c+j), V(r, c))}$$

where V(r,c) denotes brightness of the original image, $V^*_f(r,c)$ denotes a result obtained by filtering one of rows and columns of the image V(r,c), S denotes a window size for the filtering, u(z) denotes the equation $$u(z) = \exp\left(-\frac{z^2}{2\sigma_D^2}\right),$$

w(x,y) denotes the equation $$w(x, y) = \exp\left(-\frac{(x-y)^2}{2\sigma_R^2}\right),$$

and $\sigma_D$ and $\sigma_R$ denote predetermined constants; and $$V_f(r, c) = \frac{\sum_{i=-S/2}^{S/2} V_f^*(r+i, c)*u(i)*w(V_f^*(r+i, c), V_f^*(r, c))}{\sum_{i=-S/2}^{S/2} u(i)*w(V_f^*(r+i, c), V_f^*(r, c))}$$

where V(r,c) denotes a result obtained by filtering the unfiltered rows or columns using the filtering result $V^*_f(r,c)$.

11. The method of claim 4, wherein the detecting of the image in which contrast of the specific area has been adjusted is detected using the equation $$D=f(V_f,V)=(2^n-1)*k*V/(V_f+b)$$

where D denotes the contrast-adjusted image, and k and b denote predetermined constants.

12. The method of claim 4, wherein the adjusting of the brightness of the specific area is adjusted using the equation $$V'=f_w(V+a*(2^n-1-V_f)*f_h(D-V))$$

where V' denotes the image in which the brightness of the specific area has been adjusted, a denotes the factor detected using the characteristic values, $f_w(x)$ denotes $$f_w(x) = \begin{cases} x : x \leq (2^n - 1) \\ 2^n - 1 : x > (2^n - 1) \end{cases}, \text{ and}$$

$$f_b(x) \text{ denotes } f_b(x) = \begin{cases} x/(2^n - 1) : x \geq 0 \\ 0 : x < 0 \end{cases}.$$

13. A computer readable recording medium storing a computer readable program for executing the method of one of claims 1 and 4.

14. An apparatus for adjusting brightness of an image, the apparatus comprising:
- a distribution information detector for detecting number distribution information of pixel brightness;
- a brightness adjuster for adjusting the brightness of a specific area of the image using characteristic values according to a distribution characteristic of the detected number distribution information;
- an examiner for determining whether contrast adjustment of the image is required; and
- a contrast adjuster for adjusting contrast of the image in response to determining that the contrast adjustment of the image is required.

15. The apparatus of claim 14, wherein the contrast adjuster comprises:
- a reference brightness value detector for detecting a first reference brightness value indicating low-brightness for the image and a second reference brightness value for indicating high-brightness for the image; and
- an RGB adjuster for adjusting R, G, and B of the image using the detected first and second reference brightness values,
- wherein the distribution information detector detects number distribution information of the RGB-adjusted image.

16. The apparatus of claim 14, wherein the brightness adjuster comprises:
- a characteristic value detector for detecting the characteristic values;
- a factor detector for detecting a factor for adjusting the brightness of the specific area using the detected characteristic values;
- a first color coordinate system transformer for transforming an RGB color coordinate system of the image to a color coordinate system presenting brightness;
- a filtering unit for performing edge preserving noise filtering of the transformed image;
- a specific area contrast adjuster for detecting an image in which contrast of the specific area has been adjusted from the image in which the edge preserving noise filtering has been performed;
- a specific area brightness adjuster for adjusting brightness of the specific area using the contrast-adjusted image; and
- a second color coordinate system transformer for transforming the color coordinate system of the brightness-adjusted image to the RGB color coordinate system.

17. The apparatus of claim 16, wherein the characteristic value detector divides the number distribution information presented as a histogram into a plurality of areas based on the brightness and detects characteristic values of the divided areas.

18. The apparatus of claim 16, wherein the filtering unit filters rows of the image and then filters columns of the image based on the row filtering result, or filters columns of the image and then filters rows of the image based on the column filtering result.

* * * * *